March 9, 1971  N. A. FRANKS  3,568,488
METHOD OF CUTTING AN ELONGATED TUBE AND APPARATUS THEREFOR
Filed Nov. 25, 1968  13 Sheets-Sheet 3
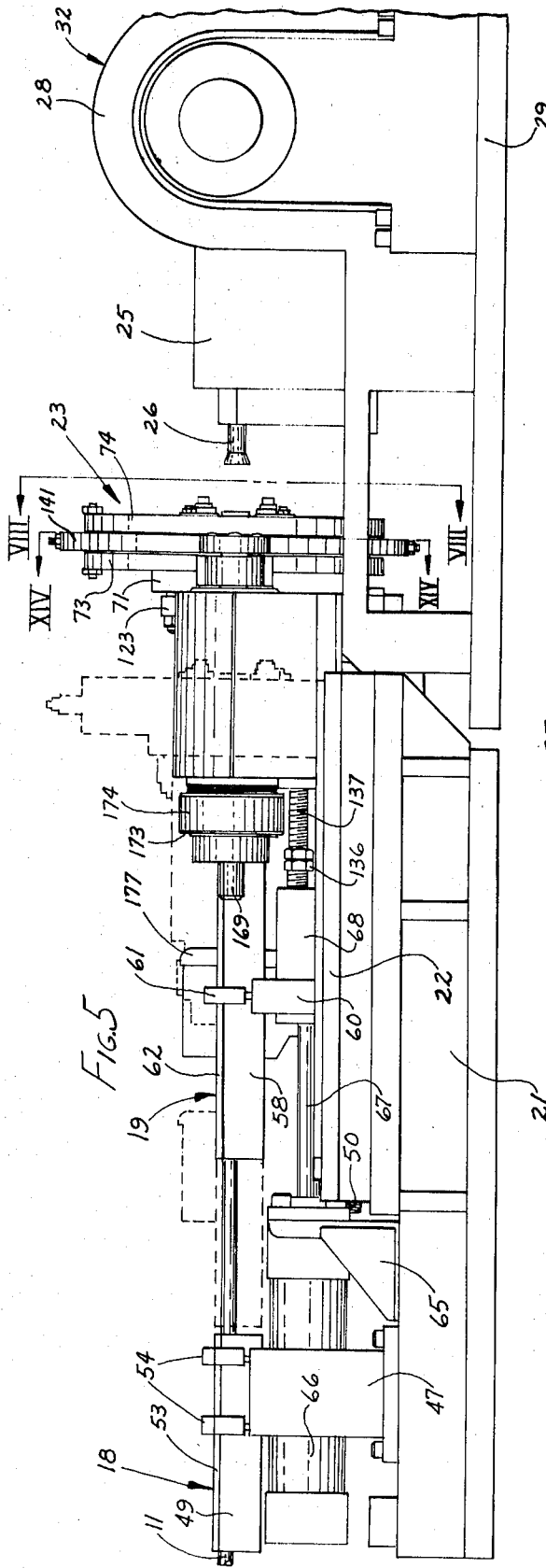
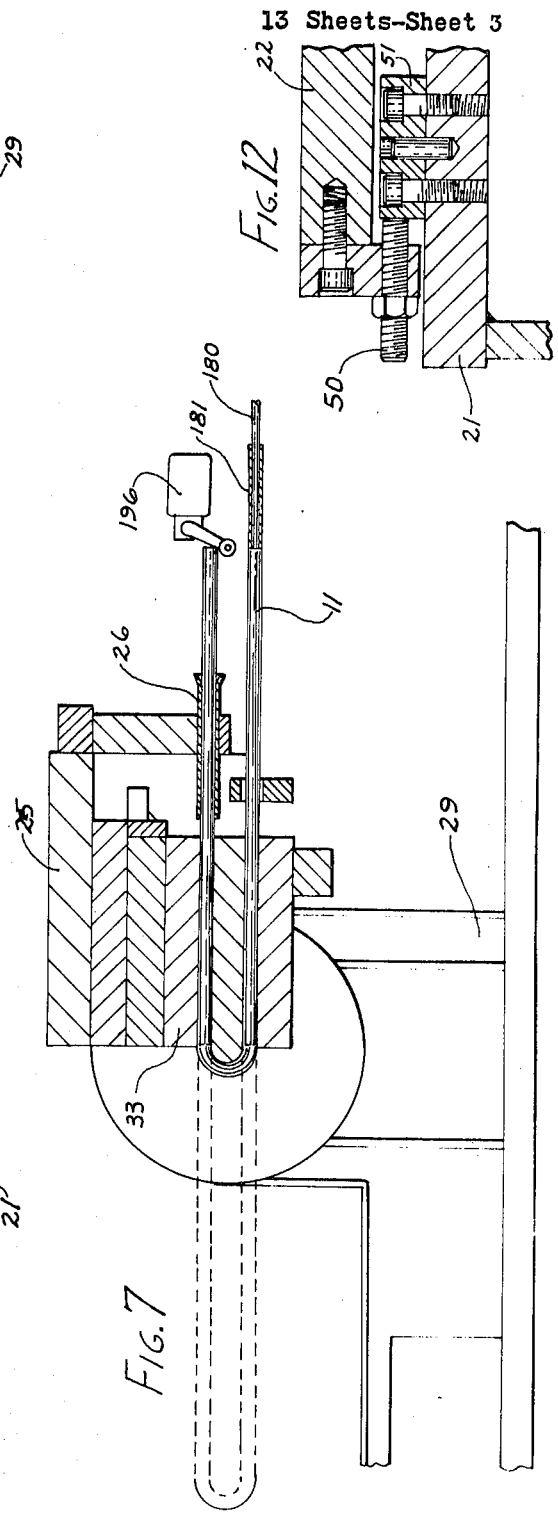
INVENTOR.
NEWELL A. FRANKS
BY
Woodhams, Blanchard & Flynn
ATTORNEYS

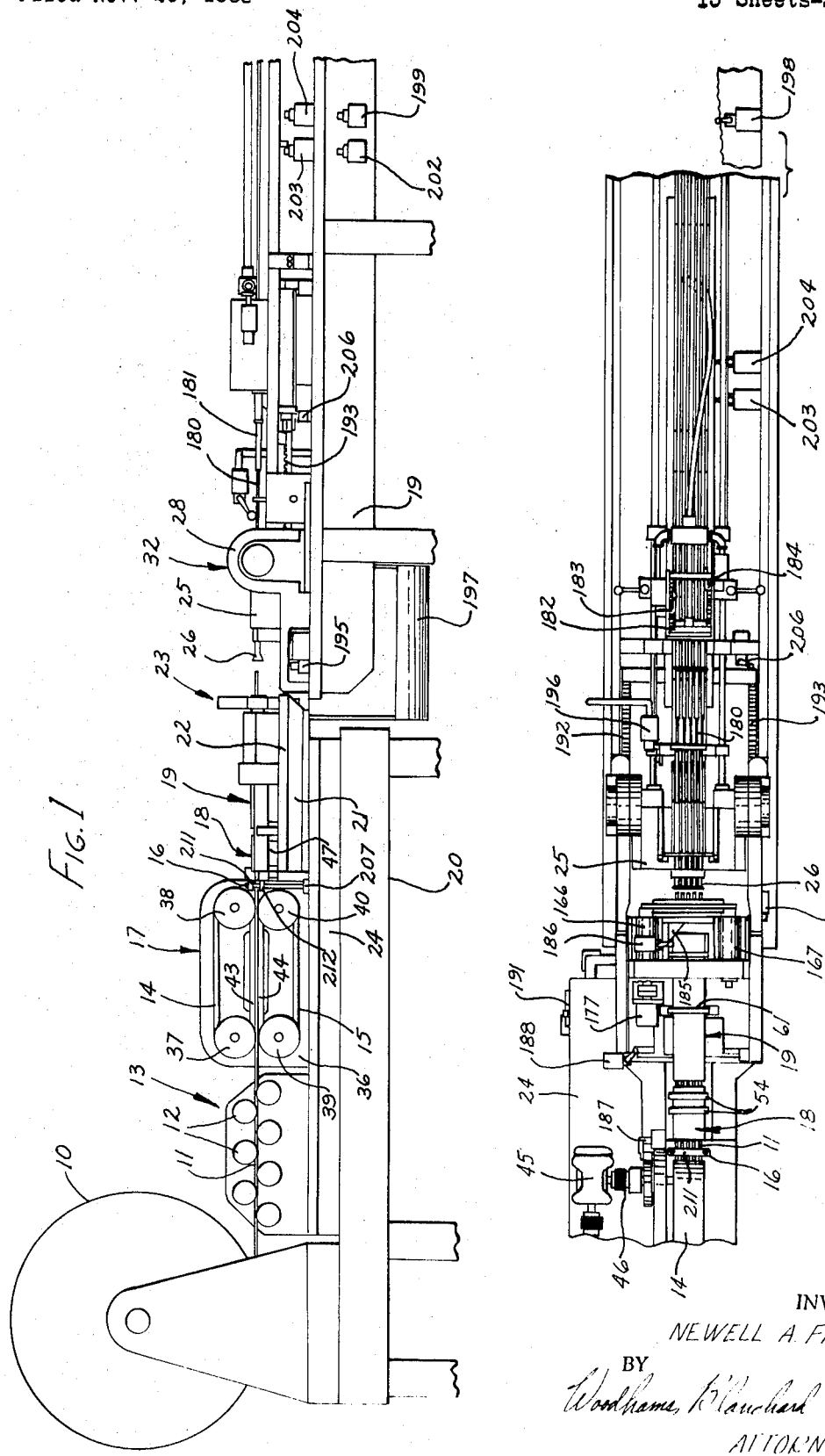

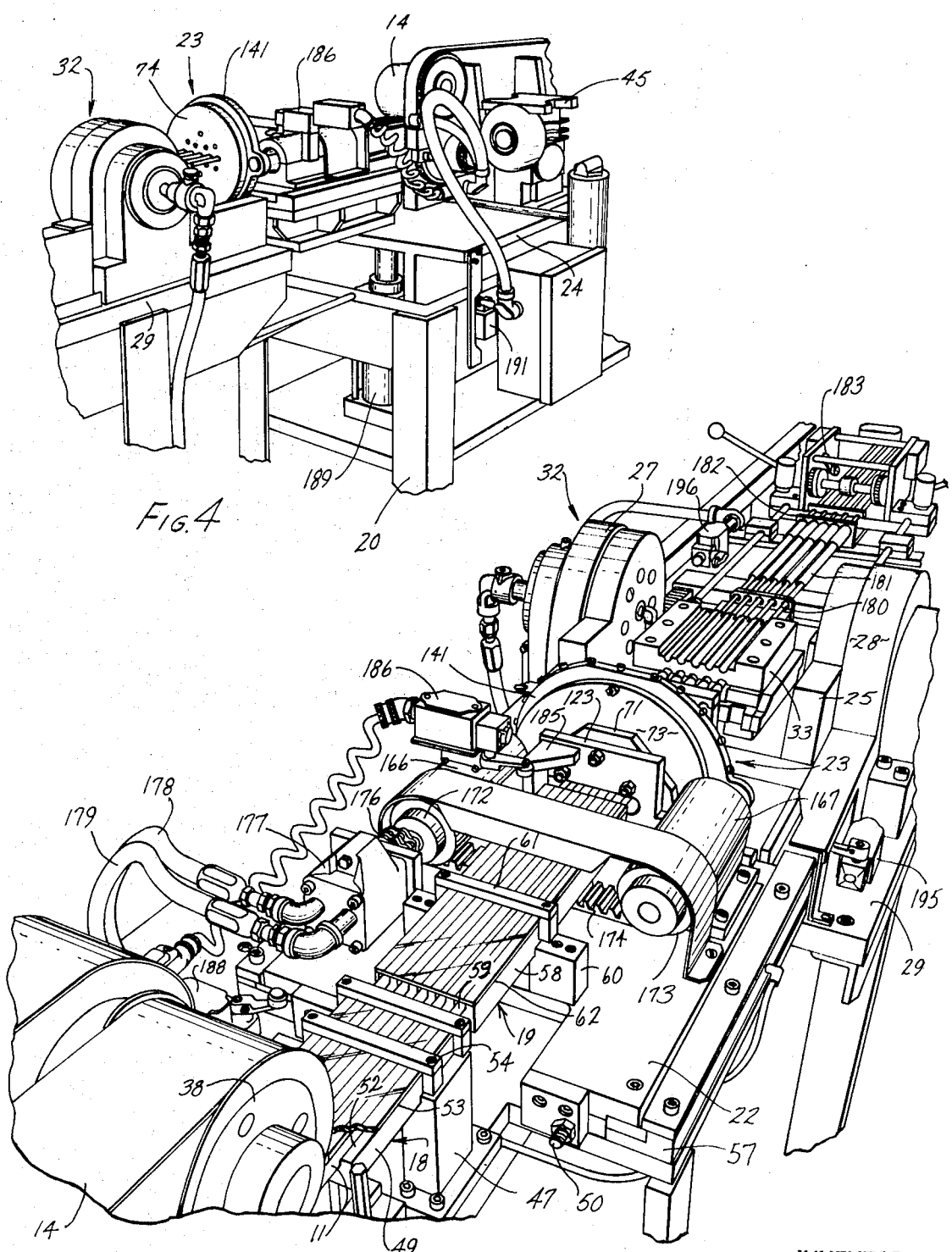

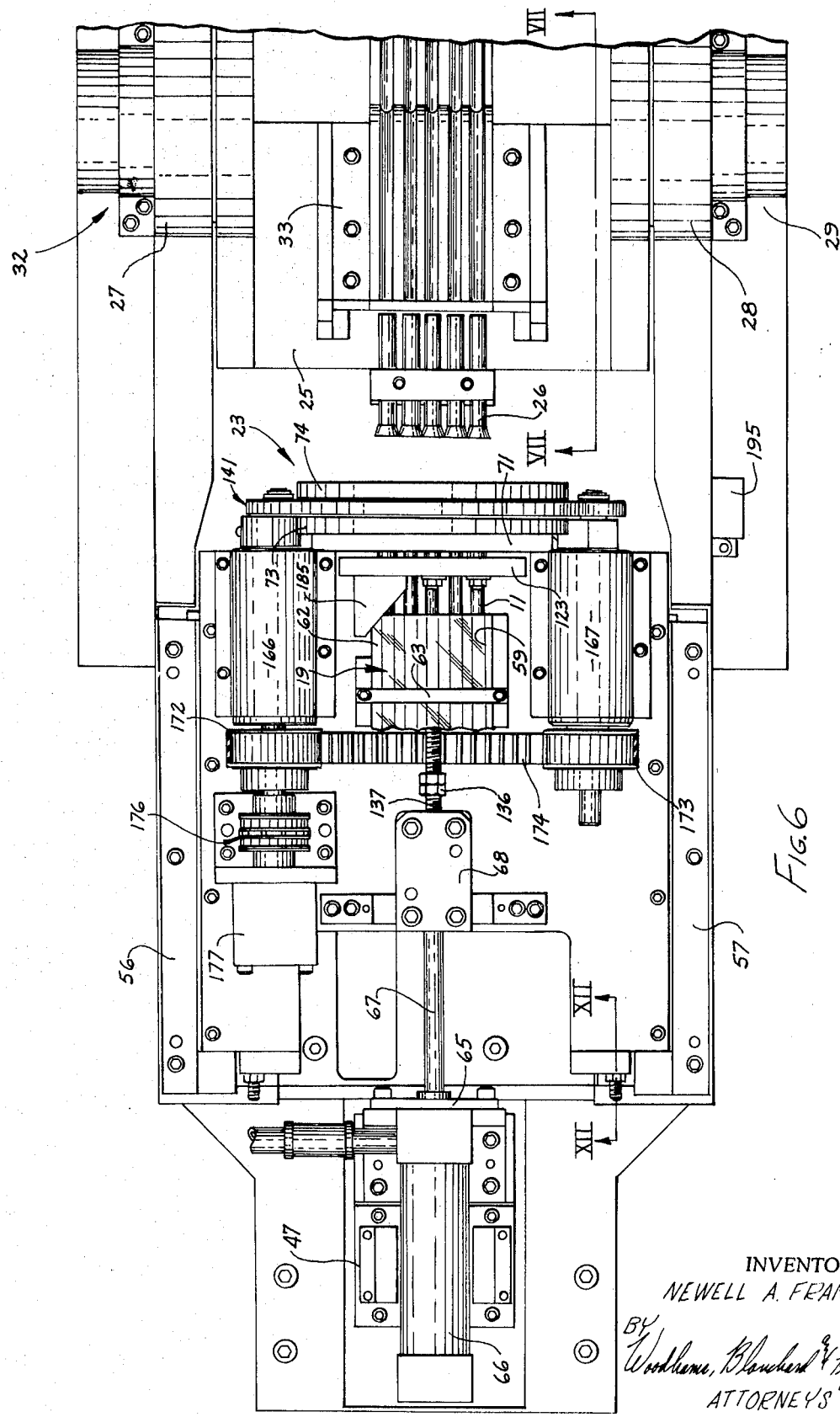

INVENTOR.
NEWELL A. FRANKS
BY
Woodhams, Blanchard & Flynn
ATTORNEYS

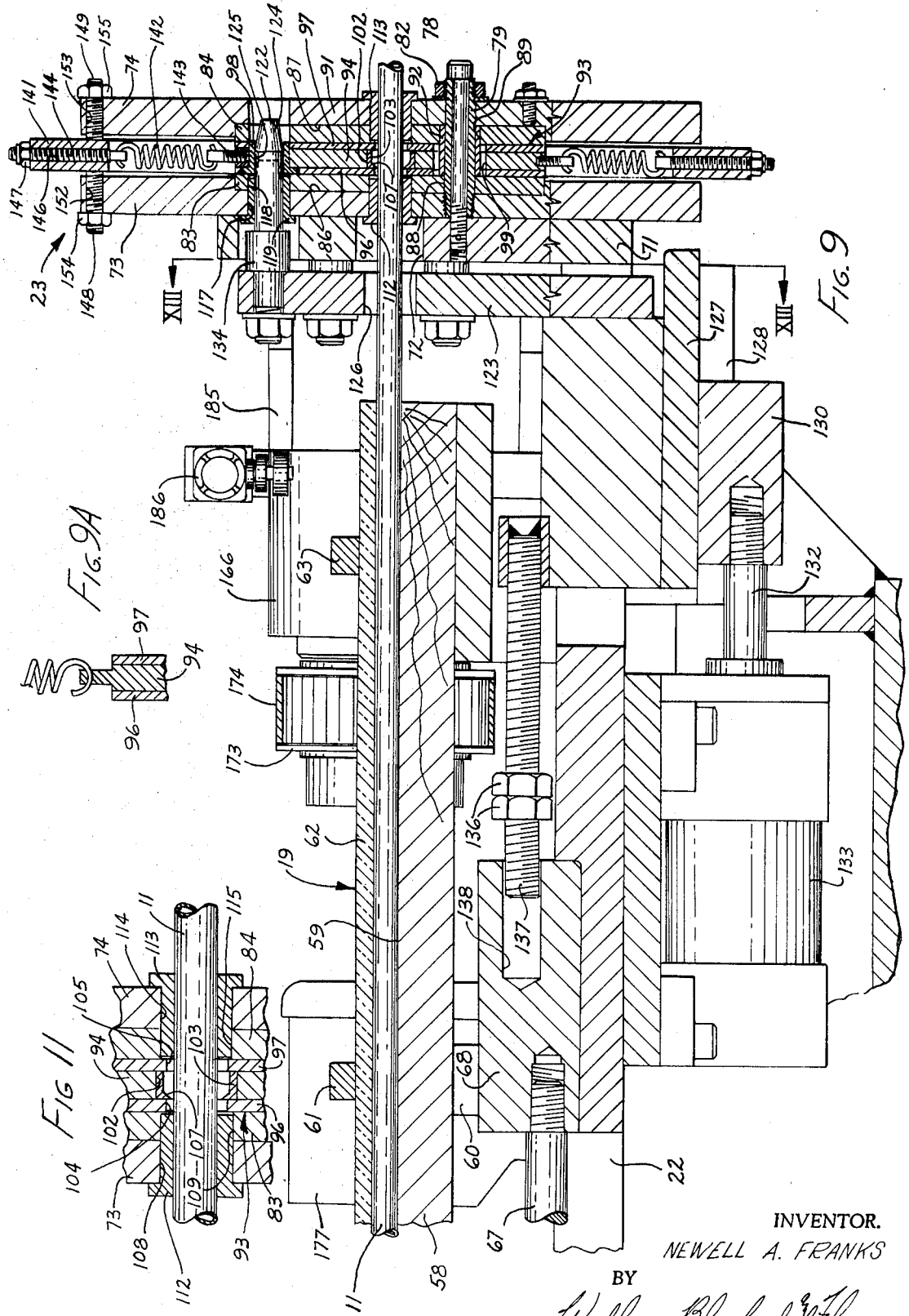

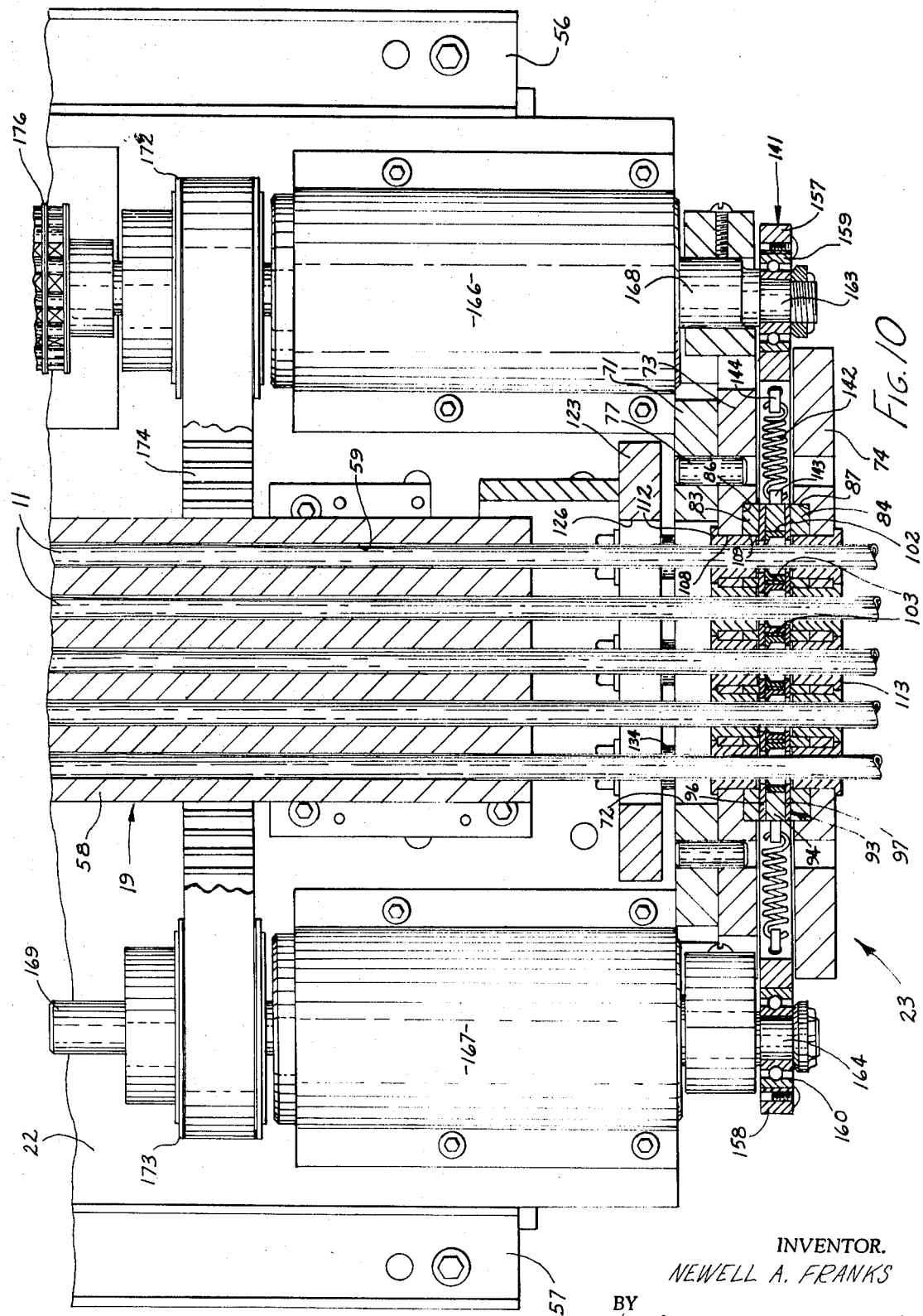

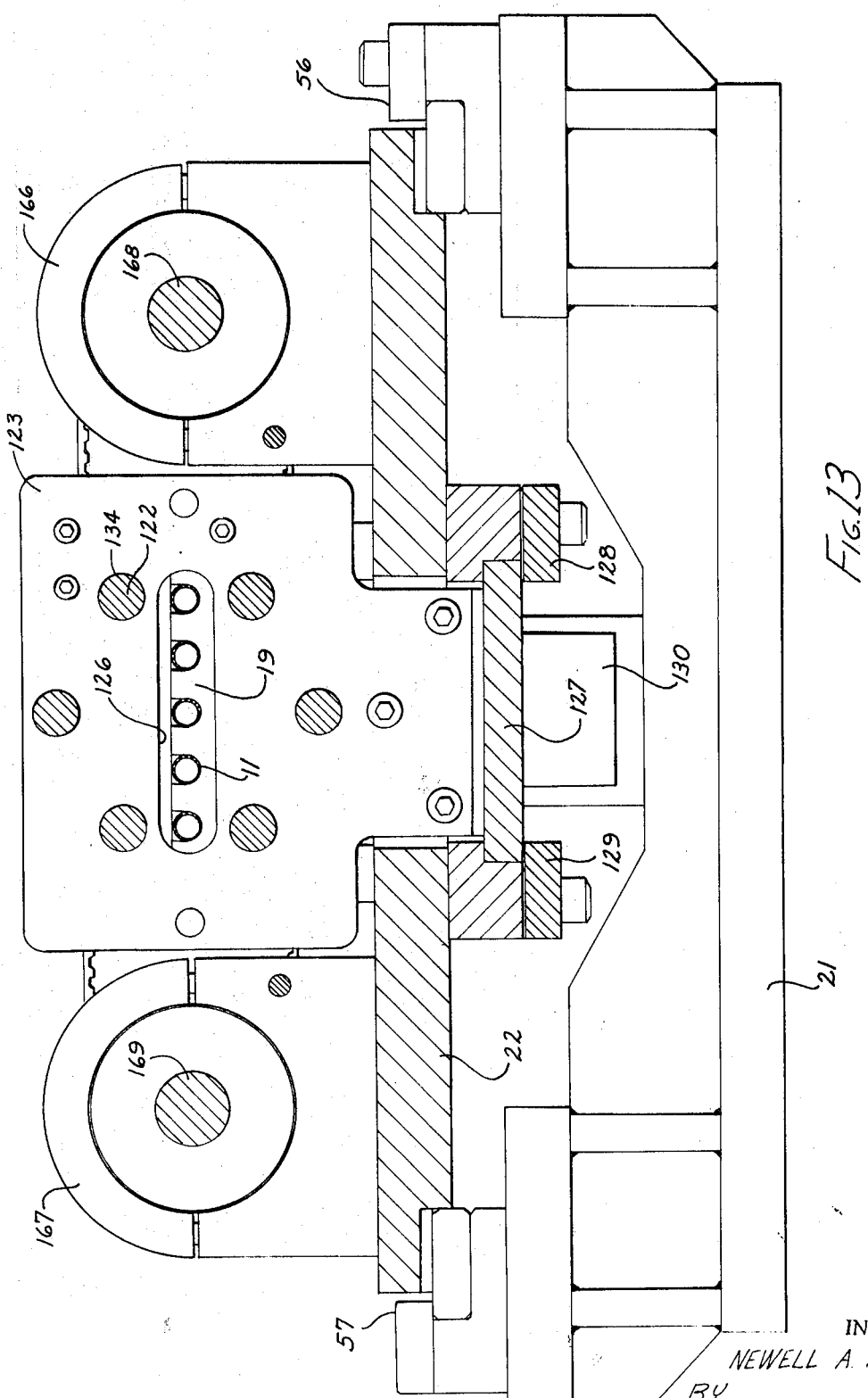

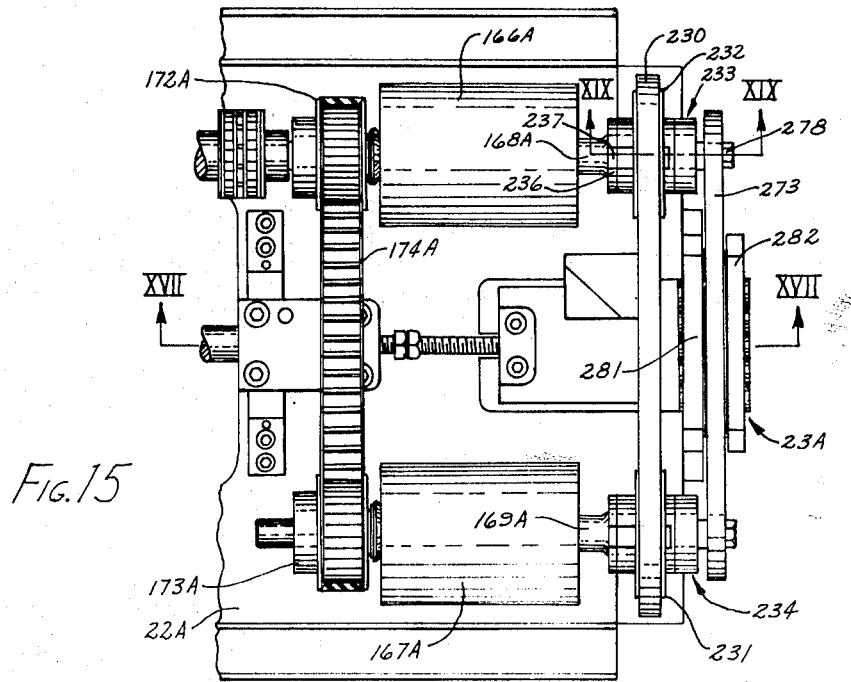
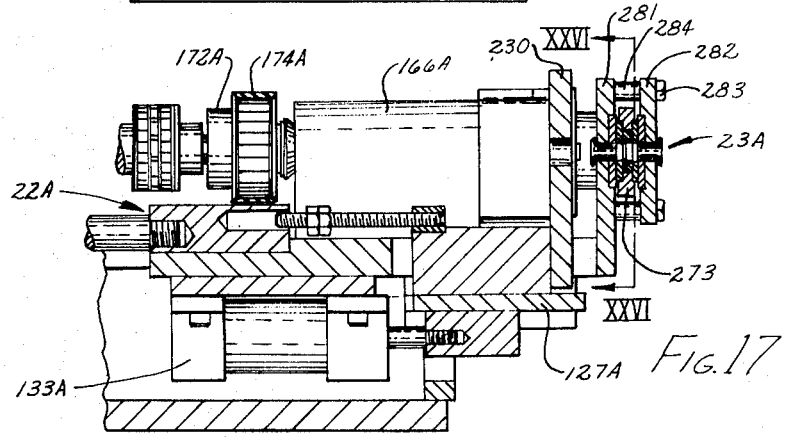
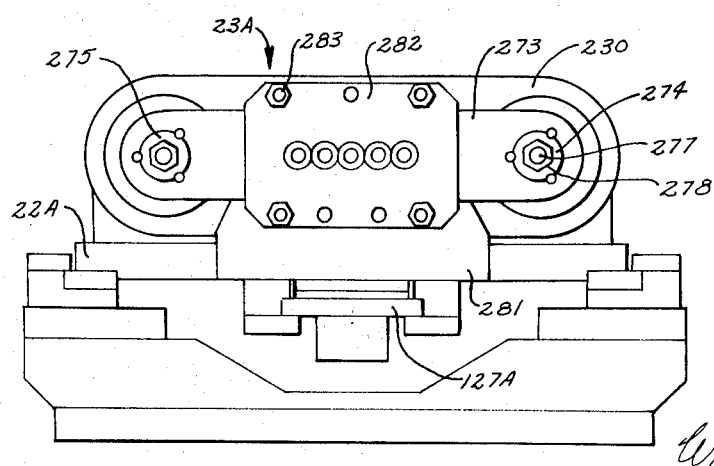

March 9, 1971  N. A. FRANKS  3,568,488
METHOD OF CUTTING AN ELONGATED TUBE AND APPARATUS THEREFOR
Filed Nov. 25, 1968  13 Sheets-Sheet 10
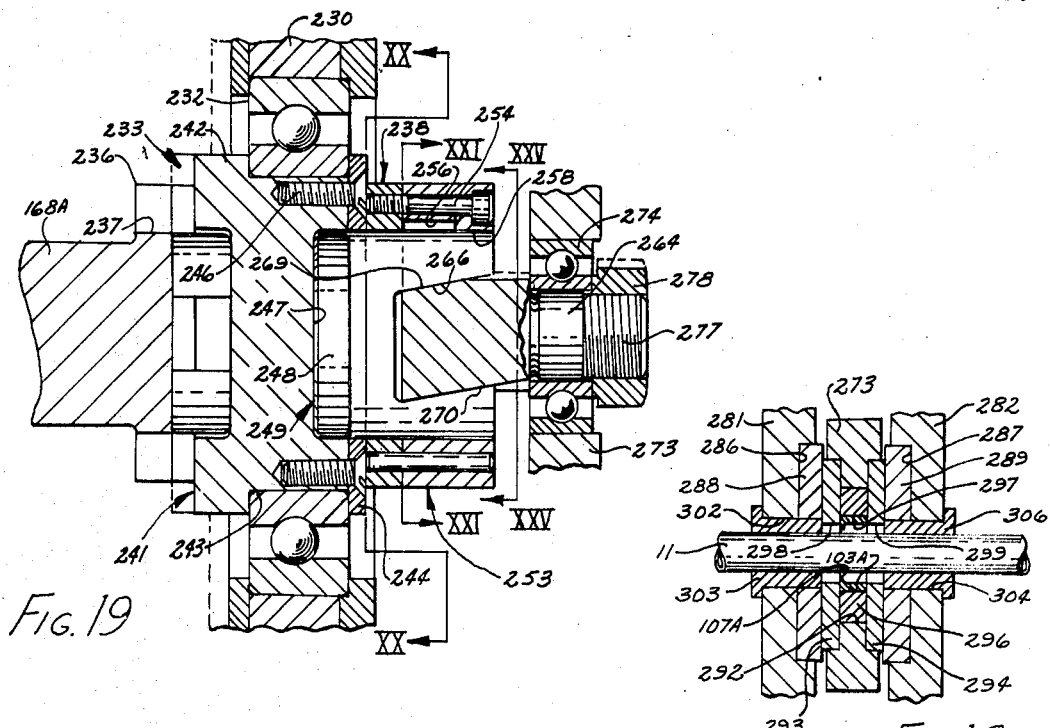
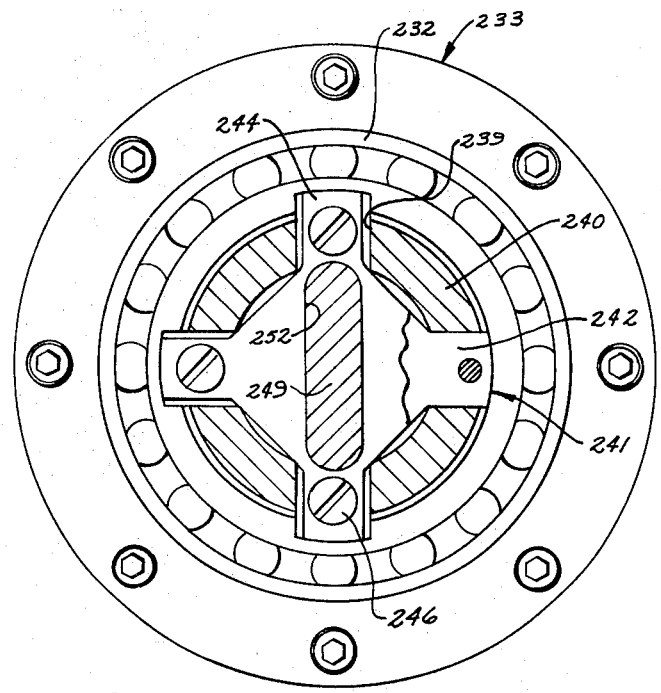
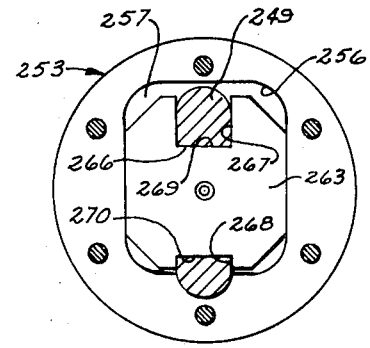
INVENTOR.
NEWELL A. FRANKS
BY
Woodhams, Blanchard & Flynn
ATTORNEYS INVENTOR.
NEWELL A. FRANKS
BY
Woodham, Blanchard & Flynn
ATTORNEYS

INVENTOR.
NEWELL A. FRANKS

INVENTOR.
NEWELL A. FRANKS

United States Patent Office 3,568,488
Patented Mar. 9, 1971

3,568,488
METHOD OF CUTTING AN ELONGATED TUBE
AND APPARATUS THEREFOR
Newell A. Franks, Fawn River Township, St. Joseph County, Mich., assignor to Burr Oak Tool & Gauge Company, Sturgis, Mich.
Filed Nov. 25, 1968, Ser. No. 778,611
Int. Cl. B21b *21/00;* B21d *28/00;* B26f *3/00*
U.S. Cl. 72—68                                          8 Claims

ABSTRACT OF THE DISCLOSURE

A machine having means for guiding and intermittently advancing an elongated, tubular element a predetermined distance along a path, and for gripping two spaced portions of said element and separating them following each advancement thereof. A cutting device on the machine includes an annular cutting member with a radially inner cutting edge through which the element is slideably received during said advancement thereof. Actuating means effects movement of the cutting member in an eccentric path around the tubular element whereby the cutting operation is performed, after which the severed portion of the tube is bent and ejected from the machine.

BACKGROUND OF THE INVENTION

This invention relates in general to a method and apparatus for cutting a long length of tubular stock into relatively small, preselected lengths and bending said lengths into U-shaped members. More particularly, the invention relates to an improved method and cutting device adapted to a machine for bending the U-shaped tubular members which are assembled with plural parallel fins to form heat exchange units.

Persons familiar with the operation of tube cutting and tube bending machinery have long been aware of the need for a method and apparatus for cutting tubular stock, such as the copper pipe used in cooling coils, whereby to avoid the radially inwardly projecting burr, which has previously been formed at each cut, and to reduce the amount of maintenance required to keep the cutting device of the apparatus in completely satisfactory cutting condition. Heretofore, it has been common practice to use cutting members which are orbited around the tubular element in order to effect the cutting thereof. This arrangement created complicated and costly maintenance problems resulting from the complicated mechanism required to effect movement of the cutting members. Moreover, this type of equipment forms a radially inwardly projecting burr on the pipe adjacent the cut.

While the embodiment of the invention disclosed herein for illustrative purposes is adapted for use with a bending machine, it will be recognized that specific reference to the bending machine and the articles produced thereby is not intended to limit the scope or applicability of the invention.

Accordingly, a primary object of this invention is the provision of a method for cutting a portion of a metal tube from a length thereof while minimizing the amount of radially inwardly projecting burr formed at the cut, said method being adapted for simultaneously cutting a plurality of tubes, both quickly and accurately.

A further object of this invention is the provision of a cutting device for carrying out said method, wherein said device is inexpensive to operate, requires a minimum of maintenance, operates completely automatically and can be adapted for use on existing machines in which a tube-cutting and bending operation must be performed.

Other objects and purposes of this invention will become apparent to persons familiar with this type of equipment upon reading the following specification and examining the accompanying drawings, in which:

FIG. 1 is a schematic side view of a machine embodying the invention and arranged for advancing, cutting and bending one or more tubular elements.

FIG. 2 is a top view including the cutting and bending components of said machine.

FIG. 3 is a perspective view of the top and front side of the cutting and bending components of said machine.

FIG. 4 is a perspective view of the rear side of the cutting component of the machine.

FIG. 5 is a side elevational view of the cutting component and part of the bending component of said machine.

FIG. 6 is an enlarged fragment of the structure appearing in FIG. 2.

FIG. 7 is a sectional view taken along the line VII—VII in FIG. 6 with the bend arbor rotated 180 degrees.

FIG. 9 is a sectional view taken along the line IX—IX in FIG. 8.

FIG. 9A is an enlarged, modified fragment of FIG. 9.

FIG. 10 is a sectional view substantially as taken along the line X—X in FIG. 8.

FIG. 11 is an enlarged fragment of FIG. 9 showing a cutting tool.

FIG. 12 is a sectional view substantially as taken along the line XII—XII in FIG. 6.

FIG. 13 is an enlarged sectional view taken along the line XIII—XIII in FIG. 9.

FIG. 15 is a fragment of a top plan view of an alternate tube cutting component embodying the invention.

FIG. 16 is an elevational view of the output end of said alternate cutting component.

FIG. 17 is a sectional view taken along the line XVII—XVII in FIG. 15.

FIG. 18 is an enlarged fragment of FIG. 17.

FIG. 19 is an enlarged sectional view taken along the line XIX—XIX in FIG. 15.

FIG. 20 is a sectional view taken along the line XX—XX in FIG. 19.

FIG. 21 is a sectional view taken along the line XXI—XXI in FIG. 19.

Figure 27:
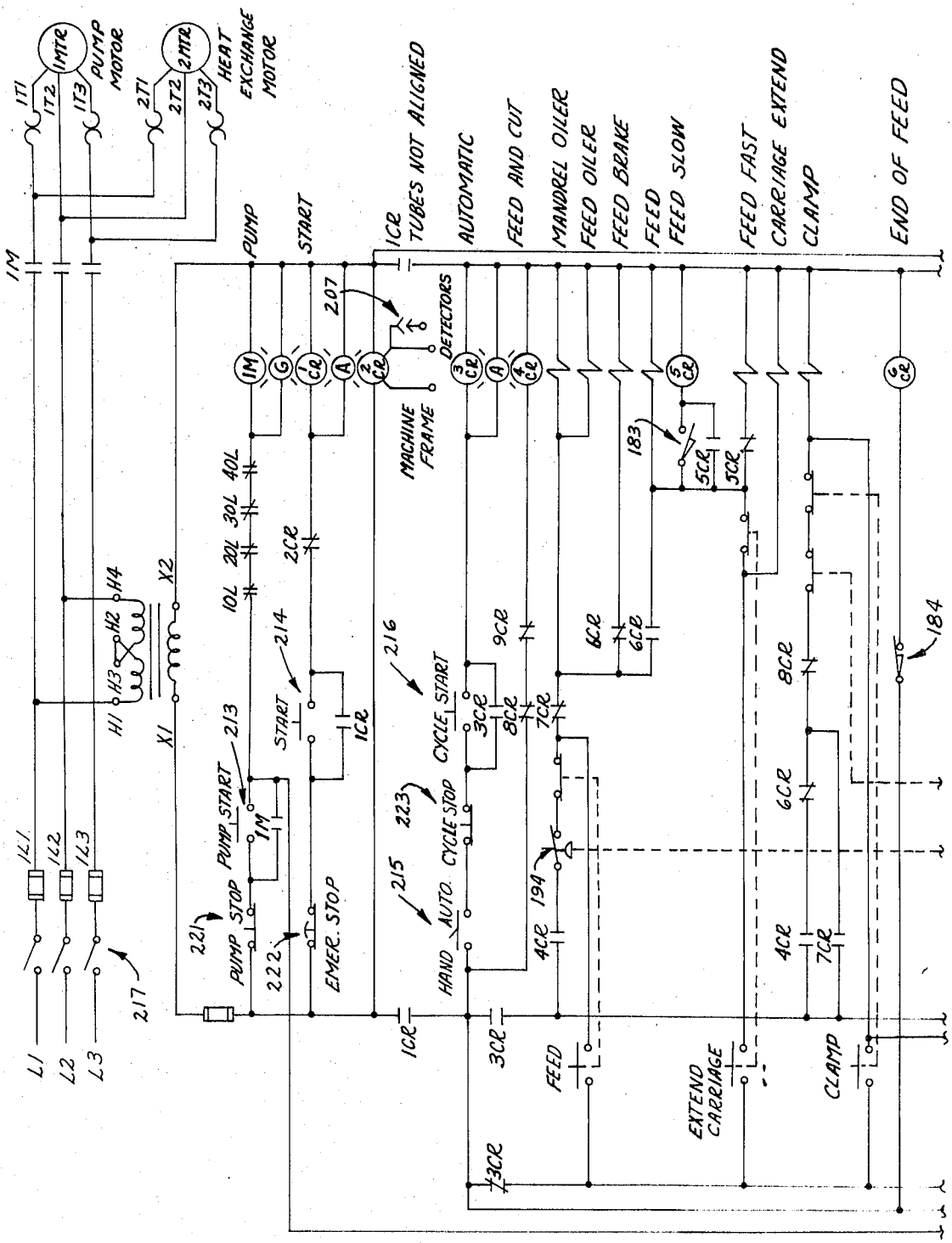
Figure 27A:
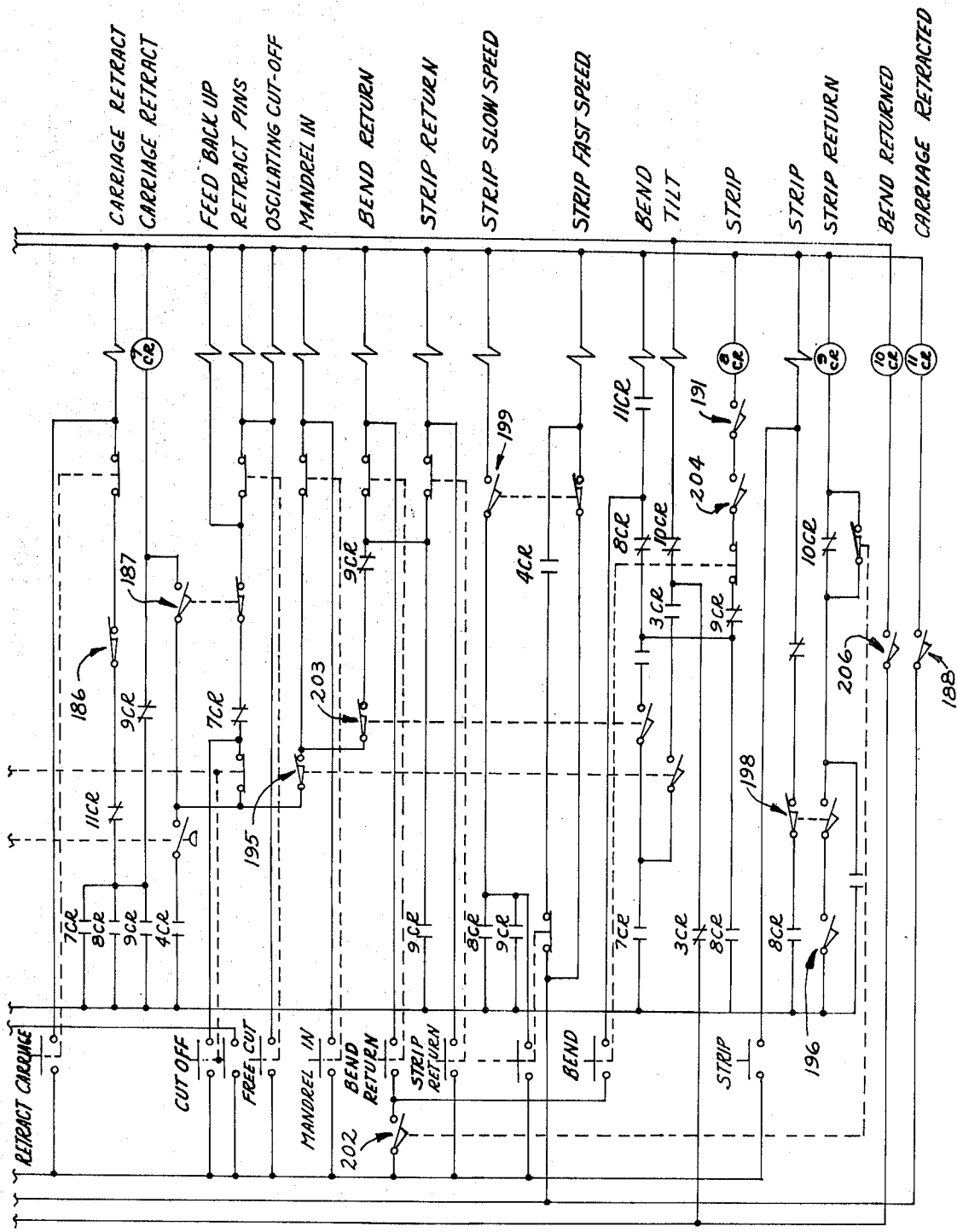

FIGS. 27 and 27A disclose in two parts a schematic diagram of the electrical circuit of the apparatus embodying the invention.

For convenience in description, the terms "upper," "lower," "front," "rear" and words of similar import will have reference to the machine embodying the invention as appearing in FIGS. 1 and 5 which disclose the front side of the machine. The terms "input" or "entry" and "output" or "exit" will have reference to the left and right ends, respectively, of the machine as appearing in FIGS. 1 and 2. The terms "inner," "outer" and derivatives thereof will have reference to the geometric center of said machine and the components thereof.

SUMMARY OF THE INVENTION

The objects and purposes of the invention, including those set forth above, have been met by providing a method and apparatus for feeding one or plural pieces of elongated tubular stock through a cutting device, gripping the stock on both sides of the cutting device and then urging the gripped portions in opposite directions away from the cutting device while causing said device to make a circular cut in the external surface of the tubular stock between the points at which it is gripped. The cutting device has an annular cutting tool with a radially inwardly extending cutting edge which is urged against the surface of the tubular stock while the axis of the cutting edge is moved in an increasing eccentric path around the axis of the tubular stock being cut.

The cutting device is mounted upon and cooperates with mechanism for advancing the tubular stock from a supply thereof, as on a drum, through the cutting device so that predetermined lengths of the tubular stock will be cut automatically. After the cutting operation is performed, the predetermined lengths of the tubular stock are bent into U-shaped members and discharged from the machine.

DETAILED DESCRIPTION

The method of the invention will be disclosed by reference to and in terms of a preferred apparatus by means of which the method can be carried out. The broad concept of feeding, cutting and bending tubular stock by an automatically controlled machine is old in the art and, in fact, the basic structures of the feeding and bending components disclosed hereinafter have been used previously in association with a different type of cutting device. However, certain novel modifications have been made in these components, particularly in the electrical controls thereof, to adapt them to the cutting device whereby to provide an improved method of tube cutting which involves coordinated performance by the feeding and bending components.

The machine selected to illustrate and embody the invention, as shown in FIG. 1, has a tube supply reel 10 at the input end thereof. Broadly speaking, one or more tubes 11, which are supported by the reel 10 or several coaxial and adjacent reels, are intermittently pulled through rollers 12 of the tube straightening unit 13 by and between adjacent reaches of the endless belts 14 and 15 of the tube drive 17. The tube or tubes are then fed through the tube position detector 16 into the fixed tube guide 18 and thence into the movable tube guide 19, these two guides being supported by the reciprocating carriage or slide 22 which is supported on the bed 21 immediately upstream of the tube cutting head 23. The tube drive 17 and bed 21 are both mounted upon the table 24, supported by base frame 20.

The tube or tubes 11 are fed through the cutting head 23 into the tube guide pipes 26, which are attached to and movable with the pivoted member 25 of the tube bending unit 32. Said bending unit 32 includes a pair of axial support members 27 and 28 which project upwardly from the frame 29 and pivotally support the member 25 for movement around a horizontal axis transverse of the machine (FIG. 6). A tube clamp 33, which receives and guides the tubes 11 from the guide pipes 26, is also supported on the member 25 downstream of said pipes to hold them while they are being bent.

The structures and operation of the supply reel 10, the straightening unit 13 and the tube bending unit 32 may be conventional. Thus, further detailed description of these parts is believed unnecessary to disclose the structure and process of the invention.

The tube drive 17 (FIG. 1) includes a frame 36 from which four parallel shafts extend sidewardly in a rectangular pattern to support the pulleys 37, 38, 39 and 40, around which the belts 14 and 15 extend. The adjacent reaches 43 and 44 of the belts 14 and 15 respectively, are positioned so that they tightly enage opposite sides of the tubes 11 which pass between and lengthwise of said reaches. The pulleys are driven by means including the motor 45 (FIG. 2) acting through a drive 46 so that the reaches 43 and 44 are both urged rightwardly, as appearing in FIG. 1, during a feeding operation. However, after the feeding operation has been performed, and at a later stage in the cutting process, the reaches 43 and 44 are urged leftwardly (FIG. 1) by an appropriate signal to apply a tension to the tubes 11.

The tubes 11 are advanced by the tube drive 17 into the fixed guide 18 which, as shown in FIGS. 3 and 5, is comprised of a pedestal 47 which is mounted upon the bed 21 and supports a guide block 49. Said block 49 has a plurality of parallel channels 52 in which the tubes 11 are snugly and slideably received and which are covered by a preferably transparent plate 53. The cover plate 53 and guide block 49 are held with respect to each other and upon the pedestal 47 by a pair of crossbars 54 which are secured to the upper ends of the pedestal 47 and extend across the cover plate 53.

The reciprocating slide 22, which supports the movable tube guide 19 (FIGS. 3 and 5), is supported along its lengthwise edges (FIG. 13) by suitable ways 56 and 57 which in turn are mounted upon the output end of the bed 21. Rightward movement (FIG. 6) of the carriage 22 is adjustably limited by engagement of the stud 50 on the left end of the carriage 22 with a block 51 (FIG. 12) on the table 24.

The movable guide 19 has a guide block 58 with a plurality of tube receiving channels 59 which are axially aligned with the channels 52 and are covered by a transparent plate 62 held in place upon the guide block 58 by the clamp bar 63. The output end of the guide block 58 is supported by a guide support 60 (FIG. 9) mounted upon the slide 22 and held in the position by a clamp bar 61.

The slide 22 is reciprocated by a hydraulic cylinder 66 (FIG. 5) which is supported at its rightward end by a pedestal 65 and which has an actuating rod 67 anchored at its outer end in the block 68 (FIG. 9) secured upon the slide 22.

A mounting plate 71 (FIGS. 3, 9 and 13) is rigidly secured in an upright position to the output end of the slide 22 and has a horizontally elongated opening 72 (FIG. 10) for receiving the tubes projected from the movable guide 19. The cutting head 23 has input and output side plates 73 and 74, respectively, which are preferably circular and substantially identical in size and shape. The input side plate 73 is mounted upon, and rigidly held against relative radial movement with respect to, the mounting plate 71 by means including the pins 77.

The side plates 73 and 74 are held against movement away from each other and are further secured to the mounting plate 71 by means including a plurality of bolts 78 (FIG. 9) which are threadedly enaged with the mounting plate 71. Each bolt 78 is embraced by an inner sleeve 79, one end of which is threadedly engaged within an appropriate threaded opening in the front side plate 73. The opposite end of the sleeve 79 is externally threaded and extends beyond the exit side plate 74 where it is engaged by a nut 82. Thus, the side plates 73 and 74 are also held against movement away from each other by the sleeve 79 and nut 82.

A pair of bearing plates 83 and 84 (FIG. 9) are snugly disposed within recesses 86 and 87, respectively, in the opposing faces of the side plates 73 and 74. The bearing plate 83, for example, has an opening 88 which snugly embraces the inner sleeve 79. The bearing plate 84 has an opening 89 which snugly embraces and receives an outer spacing sleeve 92 which engages and extends between the opposing faces of the bearing plate 83 and the axial wall 91 of recess 87. Thus, the spacing between the side plates 73 and 74 is positively controlled by the thickness of bearing plate 83 and the length of the plural outer sleeves 92.

A movable cutting tool support 93 (FIGS. 9 and 11), which is preferably circular, is slidably disposed between and of approximately the same diameter as the bearing plates 83 and 84. The cutting tool support 93 is comprised of a center plate 94 and a pair of slide plates 96 and 97 which are held in coaxial positions and against relative radial movement by flanged sleeves 98 which extend through appropriate openings in the plates 94, 96 and 97, and whose axial ends are flush with the outer sides of the plates 96 and 97.

The plates 94, 96 and 97 have axially aligned openings (FIG. 9) which together define an axial passageway 99 through the cutting tool support 93 in which the outer sleeve 92 is loosely disposed. That is, the passageway 99 permits relative radial movement of the tool support 93 with respect to the sleeve 92 hence with respect to the bearing plates 83 and 84. The center plate 94 (FIG. 9) has a plurality (here five) of openings 102 aligned along the horizontal axis of the plate and in each of which a cylindrical tool 103 is snugly but slideably disposed. The slide plates 96 and 97 have openings 104 and 105, respectively, which are coaxial with and somewhat smaller than the opening 102 so that said plates engage the opposite ends of the tool 103. Said openings 104 and 105 are also somewhat larger than the outside diameter of the tube 11 so that the tube 11 can be inserted therethrough and to allow for relative radial movement of tool support 93 with respect to tube 11 during a cutting cycle.

Each tool 103 (FIG. 11), of which there are five in this particular embodiment, has an integral, and radially inwardly projecting, annular cutting edge 107 which is slightly larger in inside diameter than the outside diameter of a tube 11 and somewhat smaller than the diameters of the openings 104 and 105. One or more tools 103 can be removed and replaced merely by separating the slide plate 97, for example, from the center plate 94, after which the tool can then be removed from the opening 102.

The entry side plate 73 (FIG. 11) and adjacent bearing plate 83 are provided with plural pairs of coaxial sleeve openings 108 and 109, respectively, in which a flanged guide sleeve 112 is snugly received. The guide sleeve 112 has an inside diameter slightly larger than the outside diameter of the tube 11 and serves to guide the tube through the cylindrical tool 103 in the tool support 93.

A plurality of flanged sleeves 113 (FIG. 9) are snugly received into coaxial pairs of openings 114 and 115 in the exit side plate 74 and exit bearing plate 84, respectively, and said flanged sleeves 113 are preferably identical with and axially aligned with the flanged sleeves 112, for the purpose of guiding the tube 11 as it departs from the cutting tool support 93. Thus, as shown in FIG. 10, there are five each of the flanged sleeves 112 and 113 for handling five tubes 11 at the same time in this particular embodiment. The sleeves 112 and 113 slideably embrace those portions of the tubes 11 adjacent to the opposite sides of the tool support 93 to hold said portions against radial movement during the cutting operation discussed hereinafter.

The entry side plate 73 and entry bearing plate 83 are provided with a plurality of axially aligned openings 117 and 118 (FIG. 9) in which the flanged pin sleeves 119 are snugly received. Each pin sleeve 119 (of which there are six in this embodiment) is axially alignable with, and of approximately the same inside diameter as, one of the flanged sleeves 98. Each of six lock pins 122 supported upon an upright lock plate 123 (FIG. 9) slideably extends into each sleeve 119.

Each lock pin 122 has a tapered tip 124 corresponding to the tapered opening 125 in the flanged sleeve 98. As the pins 122 are withdrawn from flanged sleeve 98, the cutting tool plate support 93 is permitted to travel eccentrically, being driven from support ring 141, through springs 142 connected to the tool plate support 93. The greater the amount of withdrawal of the pins 122, the greater the eccentricity of the tool plate support 93, hence, the cutter 103 with respect to the tube element 11.

The lock plate 123 has a horizontally elongated opening 126 (FIGS. 9 and 13) through which the tubes 11 can freely move as they pass from the movable guide block 58 to the tube cutting head 23. The lock plate 123 is secured at its lower end upon a slide 127 which is in turn engaged along its opposite edges by the guides 128 and 129 secured to the lower surface of the slide 22. A block 130, which is mounted on the lower side of slide 127, is secured to the free end of the actuating rod 132 (FIG. 9) of a pressure fluid actuated cylinder 133 secured to the carriage 22. Thus, the cylinder 133 can reciprocate said slide 127, hence, the lock plate 123, whereby the lock pins 122 are moved axially of the sleeves 98.

Rightward movement (FIG. 9) of the slide 127 relative to carriage 22 is limited by engagement of the enlargements 134 on the lock pins 122 with the flanged faces of the pin sleeves 119. Leftward movement of the slide 127 relative to the carriage 22 is adjustably limited by engagement between the lock nuts 136 on the screw 137 and the rightward face of the anchor block 68 on the carriage 22. The rightward end of the screw 137 is secured to the slide 127 and the left end of the screw 137 is slideably receivable into an opening 138 in the block 68.

The cutting tool support 93 (FIG. 9) is resiliently suspended substantially coaxially within the support ring 141 by a plurality of springs 142, and the inner edge of the ring 141 is disposed between the side plates 73 and 74. The inner end of each spring 142 engages a screw eye 143 which is threadedly anchored in the circumferential edge of the center plate 94 or is inserted in a hole provided in the outer circumference of plate 94 (FIG. 9A). The outer end of each spring 142 is engaged with a screw eye 144, the shank of which extends through a radial opening 146 in the ring 141 for threaded engagement at its outer end by a nut 147. Thus, tension on each spring 142 can be altered as required by tightening or loosening the nuts 147 on the screw eyes 144. Studs 148 and 149 are threadedly received through openings 152 and 153, respectively, and engaged by lock nuts 154 and 155 for engaging and thereby spacing the ring 141 with respect to the side plates 73 and 74, axially thereof.

Figure 8:
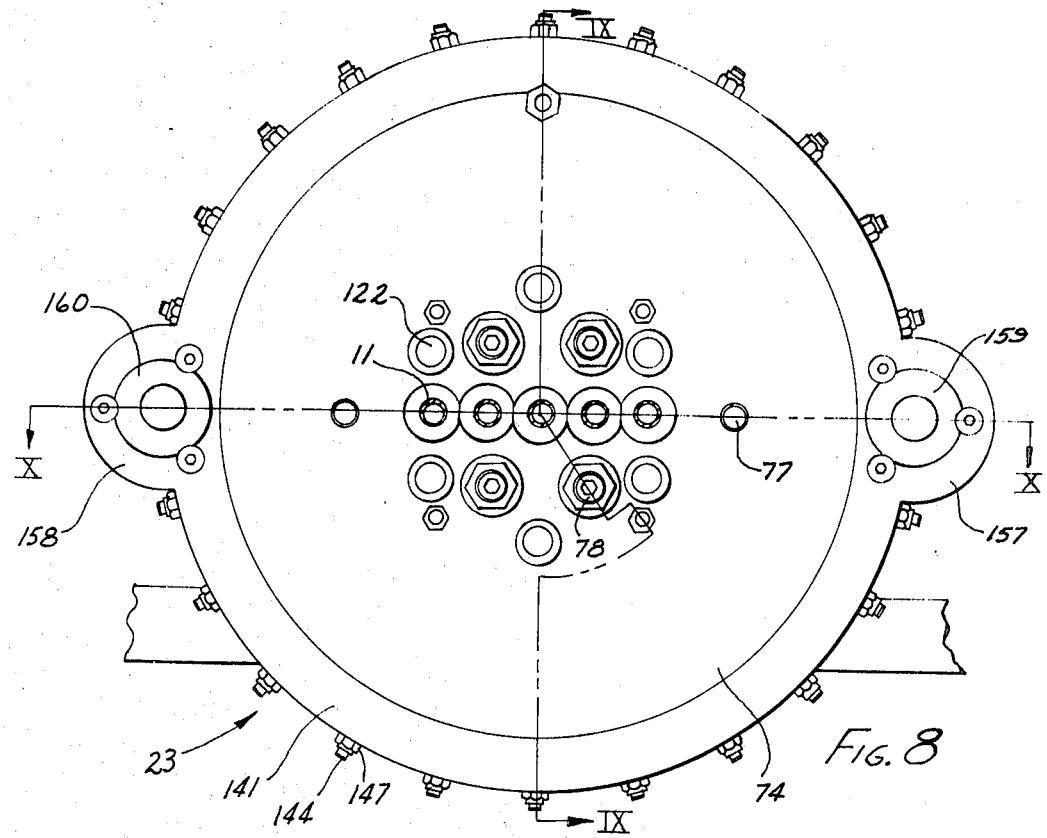
FIG. 8 is an enlarged sectional view taken along the line VIII—VIII in FIG. 5.
Figure 14:
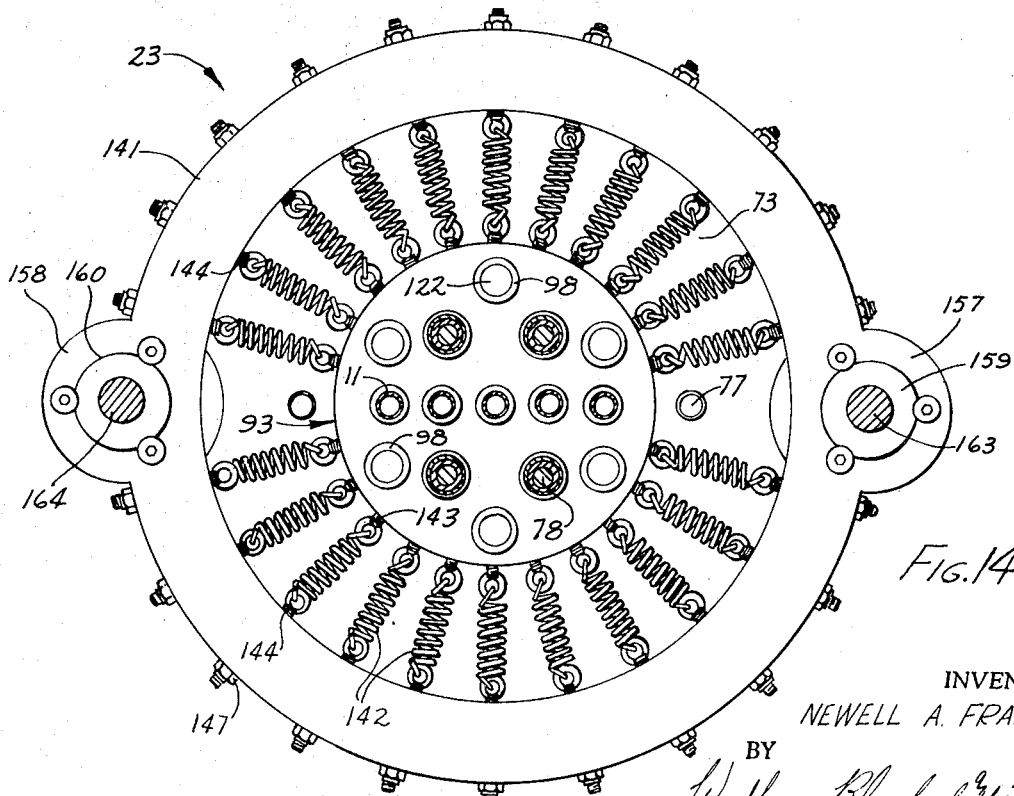
FIG. 14 is a sectional view taken along the line XIV—XIV in FIG. 5.

The support ring 141 (FIG. 14) has a pair of diametrically disposed, integral projections 157 and 158 in which bearings 159 and 160 are disposed for engagement with the eccentric ends 163 and 164 of the shafts 168 and 169 (FIG. 10) supported by the bearing structures 166 and 167, respectively, which are mounted upon the reciprocating carriage 22 leftwardly of the tube cutting head 23 (FIG. 6). Pulleys 172 and 173, which are mounted on shafts 168 and 169, are engaged by an endless belt 174 for simultaneous rotation of said shafts. The shaft 168, in this embodiment, is coaxially coupled with the shaft 176 of the hydraulic motor 177 supported upon the carriage 22 for driving the shafts 168 and 169, whereby eccentric motion is imparted to the support ring through the suspending springs 142 and then to the cutting tool support 93 held thereby to perform the cutting operation. The motor 177 is connected to conduits 178 and 179 for conducting pressure fluid from a source (not shown) to the hydraulic motor and return.

While a variety of devices may be used to sequence automatically the functions of tube cutting head and the related components, a preferred system therefor is discussed for illustrative purposes and, at the same time, the functioning of the system will be set forth with reference to FIGS. 27 and 27A. Specifically, as the tubes 11 are moved through the cutting head 23, through the tube clamp 33, and onto the mandrels 180 of the bending machine, they ultimately engage the stripping sleeves 181 telescoped on the mandrels 180. The sleeves 181 are, accordingly moved rightwardly (FIG. 2) at a relatively fast rate until the crosshead 182 connected to said sleeves 181 operates switch 183 which decelerates the rotational speed of motor 45, hence, the advancement speed of the tube drive. Shortly thereafter, the crosshead 182 engages switch 184 which de-energizes the drive motor 45, and closes the tube clamp 33. Operation of pressure switch 194 (FIG. 27) operates cylinder 133 to retract the pins 122 leftwardly (FIG. 2) and energizes motor 177 whereby the cutting head 23 is caused to move in an annular path around each tube 11.

Switch 186 is operated by the cam 185 on the lock plate 123 when the pins 122 are fully withdrawn from their locked positions.

A switch 187 (FIG. 2) is mounted on the table 24 for engagement by the drive 46 and for operation only when the reaches 43 and 44 (FIG. 1) are moved leftwardly by the motor 45. Such operation de-energizes the motor 45 and the motor 177. Also, operation of switch 187 retracts the cylinder 66 (FIG. 6) whereby the carriage 22 is moved leftwardly until it operates switch 188 mounted on the the bed 21.

Operation of switch 188 extends the hydraulic cylinder 189 (FIG. 4) whereby the output end of the table 21 is pivoted upwardly around the input end thereof. The switch 191 secured to the base frame 20 is operated by the actuator connected to the table 24 when said table reaches its raised position. Switch 188 also initiates the bending movement of the pivoted member 25 whereby the cut portions of tube 11 are bent into U-shaped pieces.

The bending movement of the member 25 (FIG. 2) is effected by a pair of racks 192 and 193, which are mounted on the frame 29 for lengthwise movement thereof. Said racks engage gears (not shown) connected to the member 25 concentrically with the pivot axis thereof. The racks 192 and 193 move leftwardly (FIG. 2) to bend the tubes until the rack 193 engages switch 195 which is mounted on frame 29 and retracts the mandrels 180. The switch 204 is tripped by the retraction of the mandrels and releases the clamp 33 and terminates the rack movement. Switch 204 also actuates means, such as a power cylinder and appropriate linkage (not shown), whereby the stripping sleeve 181 are urged leftwardly to discharge the bent tubes from the bending unit 32 into the chute 197 below the cutting head 23.

Switch 198 (FIG. 2) is operated when the stripping sleeves 181 reach their fully extended or leftward positions whereby their rightward return is effected, providing switch 196 is cleared. Switch 196 is a safety check. Providing all tubes 11 are discharged, the switch 196 allows the stripping sleeves to return. If any or all of the tubes are not discharged, switch 196 stops the automatic cycle of the machine. Switch 199 is operated just before the stripping tubes are fully retracted and effects a reduction in the speed of their retraction movement. Thereafter, switch 202 is operated whereby the retraction of the stripping tubes is terminated.

Movement of the mandrels 180 is effected toward and away from the bending unit 32 by power linkage means (not shown) supported on the frame 29.

Mandrel movement toward the unit 32 is initiated by a pressure switch 194 (FIG. 27) when the clamp 33 is is closed. Operation of switch 195 by the rack 193 initiates return or retracting movement of the mandrels 180. Switch 204, which is in series with switch 191, is closed when the mandrels return to their rightward or retracted positions, whereby the clamp 33 is released. Closure of switch 198 also causes the racks 192 and 193 to return the pivoted member 25 to its original position of FIG. 3. In so doing, rack 193 closes switch 206 whereby hydraulic cylinder 189 is caused to lower the table 24. Since carriage 22 is in the retracted or leftward position, and due to the condition of switches 206 and 202, another cycle of operation will commence with rightward movement of the carriage 22 and of the tubes 11.

Figure 22:
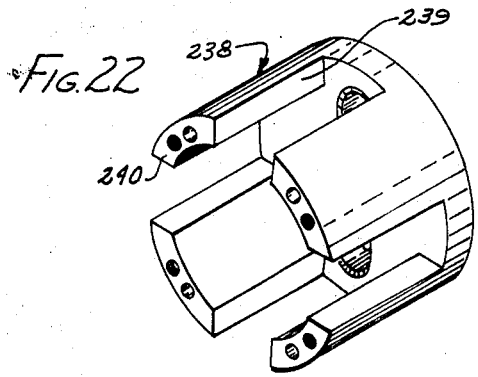
FIG. 22 is a perspective view of the annular member in the eccentric mechanism.

Switch 207 (FIGS. 1 and 22) is mounted upon the table 24 (FIG. 1) so that it is operated to de-energize substantially the entire electrical system of the machine if the detector 16 is shorted out by a misaligned tube 11 passing from the tube drive 17 to the fixed guide 18. The detector 16 has a pair of spaced bars 211 and 212 which extend transversely of, above and below, the tubes 11 between the drive 17 and guide 18. The bars 211 and 212 are supported upon a post having a base plate mounted upon the table 24 and operably connected to said switch 207. Said bars 211 and 212 are spaced slightly from the tubes 11 when they are properly aligned with or within the channels 52.

A pump switch 213 (FIGS. 27 and 27A), start switches 214, 215 and 216 and a master switch 217 must be closed to energize the electrical system of the machine. Stop switches 221, 222 and 223 are provided for the indicated purposes.

OPERATION

While the operation of the above-described apparatus and the portions thereof comprising the invention will be apparent to persons skilled in this art from such description, a brief summary thereof will now bet set forth.

Starting with the carriage 22 in its retracted or leftward position of FIGS. 1, 2 and 3, the plural tubes 11 are manually fed from the supply reel 10 through the tube straightening unit 13 and into the tube drive 17. Accordingly, when the various start switches 213 through 217, inclusive (FIG. 27), are closed, the drive motor 45 will be energized whereby the tubes 11 will be fed through the fixed guide 18, the movable guide 19, the tube cutting head 23, the tube guide pipes 26, the tube clamp 33 and thence onto the mandrels 180. At the same time, the carriage 22 will be moved rightwardly or extended into its rightward position of FIG. 5 where the cutting head 23 is relatively close to the guide pipes 26. During the rightward movement of the tubes, they will engage the stripping sleeves 181 and move them rightwardly until such movement causes the crosshead 182 to close switch 183 and thereby decelerates the drive motor 45, hence, the belts 14 and 15, then crosshead closes switch 184 which stops drive motor 45, hence, the belts 14 and 15. Switch 184 closes clamp 33 which energizes pressure switch 194 causing the mandrels 180 to be moved leftwardly, whereby to give maximum support to the non-moving part of the tube during the subsequent bending operation.

Closing pressure switch 194 causes the hydraulic cylinder 133 to operate and to effect the retraction or leftward movement of the lock pins 122, closing of the switch 194 also causes the motor 45 to rotate in the opposite direction from its normal feed rotation, whereby the reaches 43 and 44 of the tube drive 17 are urged leftwardly, as appearing in FIG. 1. However the tube clamp 33 tightly grips the tubes 11 extending therethrough so that the leftward urging of the reaches 43 and 44 puts said tube under tension. At the same time, the motor 177 is energized, whereby the cutting tool support 93 is urged by the eccentrics 163 and 164 acting through the springs 142 and the support ring 141 to move in annular path so that the cutting edge 107 of each cylindrical tool 103 starts to make an annular cut in the periphery of the tube which it encircles. At some point during the cutting cycle, as the cylindrical tool 103 is making its annular cut in the periphery of the tube and continuously penetrating deeper into the wall of the tube, and with the tension applied to said tube 11 by the reaches 43 and 44 of the tube drive 17, the tensile strength of the tube wall not yet severed is exceeded and the tube breaks.

Consequently, the tube material is not cut entirely through, but partially cut and partially pulled apart at the cutting point. Therefore, the internal burr is minimized by the extruding caused by the pulling apart action. At the point when the tube breaks, the cylinder 133 immediately retracts the remainder of its full travel, whereby cam 185 on the lock plate 123 actuates switch 186. The reverse direction of motor 45 actuates switch 187, which stops the drive motor 45 and the cuttter motor 177 and causes the cylinder 133 to move the pins 122 rightwardly into their locked or extended positions. Retraction of the carriage 22 closes switch 188 to operate hydraulic cylinder 189 whereby the output end of the table 24 is raised. Thus, the ends of the tubes 11 extending from the cutting head 23 are moved out of positions of interference with the guide pipes 26 during the subsequent bending operation, and the cutting head 23 is moved out of a position of interference until the discharge of the U-shaped pieces from the tube clamp 33 after the bending operation.

When switch 188 is closed, the pivoted member 25 is moved upwardly around the pivot axis thereof by the racks 192 and 193 from its FIG. 3 position into its FIG. 7 position. The rack 193 operates switch 195 to withdraw the mandrels, thereby actuating switch 204, which stops the bending operation. Operation of switch 204 also releases the clamp 33 from its engagement of the tubes 11, and causes the stripping pipes 181 to move leftwardly, as appearing in FIG. 7, to discharge the bent tubes through the broken line position thereof and then into the chute 197. Following the discharge of the bent tubes from the mandrels 180, said stripping plates 181 are returned to their rightward or retracted position and the pivoted member 25 is pivoted in a counterclockwise direction as appearing in FIGS. 7 and 1 into its FIG. 2 position by rightward movement of the rack 193. Thus, rack 193 closes switch 206 whereby the rightward end of the table 24 is lowered and another cycle of operation will commence immediately with the rightward movement of the carriage 22 and the energization of the drive motor 45 whereby the tubes 11 are fed through the cutting head 23, the pipes 26, the tube clamp 33 and thence onto the mandrels 180, as previously described.

ALTERNATE STRUCTURE

The method of the invention may also be practiced by means of an apparatus having an alternate tube cutting component including the tube cutting head 23A (FIG. 15) wherein the remainder of the apparatus is substantially the same as set forth herein above. Specifically, the carriage 22A may be substantially identical with the carriage 22 (FIG. 9) and may support a movable tube guide of the type shown at 19 in FIG. 9. Also, a slide 127A may be secured beneath and to the carriage 22A for movement by a pressure cylinder 133A also secured to the carriage 22A. However, the lock plate 123 of FIG. 9 is replaced by a horizontally elongated bearing support 230 which is rigidly secured between the ends thereof to the rightward side of the slide 127A. A pair of bearing supports 166A and 167A are supported upon the carriage 22A and in turn support shafts 168A and 169A, respectively. The shaft 168A may be connected to drive means like the motor 177 shown in FIG. 2. The leftward ends of the shafts 168A and 169A are interconnected for simultaneous driving by a pair of pulleys 172A and 173A and a belt 174A.

A pair of bearings 231 and 232 are mounted within appropriate openings in the bearing supports 230 near the opposite ends thereof, and each of said bearings embraces the X-shaped slide 241 of the identical eccentric mechanisms 233 and 234, respectively, Since the eccentric mechanisms 233 and 234 may be and preferably are identical, the mechanism 233 will be described in detail and such description will be understood to apply to the mechanism 234.

The rightward end of the shaft 168A has a concentric annular flange 236 with four uniformly disposed radially opening slots 237. An annular member 238 (FIG. 22) has four integral segments 240 of a cylinder arranged to define a cylinder and circumferentially spaced uniformly to define four slots 239. Said annular member 238 is secured to the flange 236 on the shaft 268A so that said slots 239 are in precise alignment with the slots 237 and of substantially the same width, and so that the segments 240 extend away from the flange 236.

An X-shaped slide 241 (FIGS. 19 and 20) is slideably supported within the slots 239 of member 238 for movement lengthwise thereof and for snug embracing by the inner race of the bearing 232. Each of the four radially extending legs 242 of the slide 241 has a rightwardly opening notch 243 in the peripheral edge thereof into which the inner race of the bearing 231 is received, thereby preventing leftward movement of the bearing with respect to the slide. The bearing 232 is held against rightward movement with respect to the slide 241 by an X-shaped retainer 244 (FIGS. 19 and 20) secured to the slide 241 by screws 246. Thus, the slide 241 and its retainer 244 can move when so urged by the bearing support 230 and the bearings 231 and 232 between positions indicated by solid lines and broken lines in FIG. 19.

Figure 23:
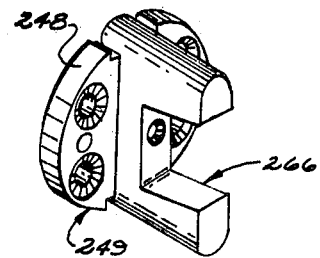
FIG. 23 is a perspective view of the cam in said eccentric mechanism.

The rightward side of the slide 241 (FIG. 19) has a recess 247 into which the flange 248 (FIG. 23) of a flanged cam 249 is received. The retainer 244 (FIG. 20) has an elongated opening 252 through which the cam 249 extends rightwardly. Thus, the flanged cam 249 is rigidly held with respect to the slide 241 and movable therewith.

Figure 25:
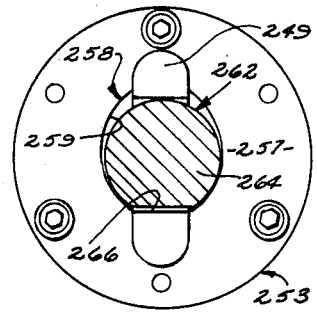
FIG. 25 is a sectional view taken along the line XXV—XXV in FIG. 19.

A collar 253 (FIGS. 19, 21 and 25) is secured to the annular member 238 by bolts 254. Said collar 253 has a substantially rectangular recess 256 opening toward said member 238 and defined by a rightward end wall 257 (FIG. 25) having an elongated opening 258 which has an enlarged central portion 259 for reasons appearing hereinafter. The lengthwise ends of opening 258 are reduced to slideably engage and guide the cam 249 in sliding movement with respect to the collar 253.

Figure 24:
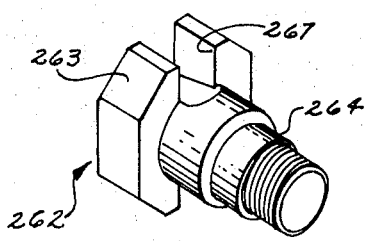
FIG. 24 is a perspective view of the stub shaft in said eccentric mechanism.

A flanged stub shaft 262 (FIGS. 19 and 24) has an approximately rectangular flange 263 disposed within the recess 256 which is of sufficient dimension lengthwise of the elongated opening 258 to permit movement of the flange 263 lengthwise of the recess 256. The circular shank 264 of the stub shaft 262 (FIG. 25) slideably extends through the enlarged central portion 259 of the opening 258. The central portion 259 is elongated to permit transverse movement of the shank 264 relative to the collar 253.

The cam 249 has a rightwardly opening slot 266, the lateral edges of which are parallel and disposed at a relatively small acute angle to the central axis of the flange 248 and the cam 249. The flange 263 on the stub shaft 262 has a pair of diametrically disposed slots 267 and 268, the inner ends 269 and 270 of said slots being parallel and sloped with respect to the central axis of the shank 264 at an angle substantially identical with the angle of slope in the lateral edges of the slot 266. The cam 249 and the stub shaft 262 are arranged and nested so that the lateral edges of the slot 266 are slideably engaged with the inner ends 269 and 270 of the slots 267 and 268.

The stub shaft 262 is held against axial movement by entrapment between the opposing surfaces of the annular member 238 and the end wall 257. However, the elongation of the recess 256 and the opening 258 permit transverse movement of the stub shaft 262 with respect to the collar 253, hence, with respect to the annular member 238, the slide 241 and the bearing support 230. Thus, when the slide 241 is moved from its solid line position to its broken line position in FIG. 19, the stub shaft 262 is moved, due to the inclined plane of engagement between the stub shaft 262 and the cam 249, into a position of eccentricity with respect to the shaft 168A.

The alternate tube cutting head 23A (FIG. 16) includes an elongated support plate 273 having parallel openings therethrough near the opposite ends thereof in which the bearings 274 and 275 are supported for rotatable engagement and support upon reduced portions of the shanks, such as the shank 264 of the stub shaft 262, extending from the eccentric mechanisms 233 and 234. The support plate 273 is held in place on said shanks by the nuts 278.

The cutting head (FIG. 17) has a pair of spaced side plates 281 and 282 which are held in spaced relationship with respect to each other by threaded rods and nuts 283 and spacers 284 through which the threaded rods extend. The entry side plate 281 is rigidly secured to the output end of the carriage 22A so that the exit side plate 282 is also rigid with respect to the carriage 22A. The side plates 281 and 282 (FIG. 18) have elongated recesses 286 and 287 in their opposing surfaces in which the bearing plates 288 and 289 are respectively received and held.

Figure 26:
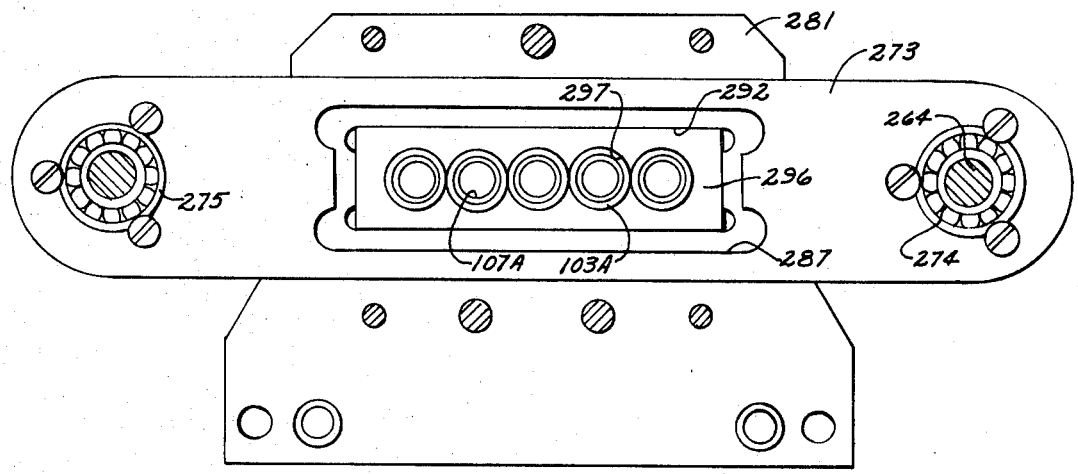
FIG. 26 is an enlarged sectional view taken along the line XXVI—XXVI in FIG. 17.

Support plate 273 (FIG. 18) has an elongated opening 292 which is slightly enlarged at the opposite faces of the support plate for receiving a pair of slide plates 293 and 294 which also serve as retainers for the tool holding insert 296 which is provided with a plurality of tool openings 297 (FIG. 18) aligned lengthwise of the insert (FIG. 26) and equal in number to the maximum number of tubes which will normally be run through the cutting head at any given time.

A plurality of cylindrical cutting tools 103A (FIG. 18), which are preferably identical with the above-described tools 103, are snugly but slideably received into the tool openings 297. The slide plates 293 and 294 are provided with openings 298 and 299 which are aligned axially with the openings 297 and slightly smaller than such openings for holding the tools 103A against axial movement with respect to the support plate 273.

The side plate 281 and its corresponding bearing plate 288 have a plurality of tube openings preferably identical with the number in the tool-holding insert 296 and axially alignable therewith. These openings define a passageway 302 into which a flanged guide sleeve 303 is received for guiding a tube 11 (FIG. 1) through the entry side of the cutting head 273 (FIG. 18). A similar plurality of passageways 304 are provided in the side plate 282 and bearing plate 289 for reception of sleeves 306 for guiding the movement of the tubes 11 through the exit side plate 282. The inside diameters of the sleeves 303 and 306 are somewhat larger than the outside diameter of the tube 11 and, the cutting edge 107A of each tool 103A is slightly larger in diameter than the outside diameter of the tube 11 for slideably receiving same therethrough.

From the foregoing description with respect to the alternate cutting head 23A, it will be seen that rotation of the shafts 168A and 169A will cause the support plate 273 to move in a circular path whereby the cutting edges 107A of the tools 103A will engage and cut annular grooves in the peripheral surfaces of tubes extending through the cutting head in much the same manner as described above with respect to the cutting head 23. It will also be seen that the shafts 168A and 169A may rotate continuously, and the cutting operation will be initiated by effecting a leftward movement of the bearing support 230 whereby the stub shafts 262 are moved into positions of eccentricity with respect to the shafts 168A and 169A, hence, with respect to the tubes extending through the cutting head 23A. Thus, the only essential difference between the operation of the alternate cutting head 23A and the cutting head 23 concerns the way in which the eccentric cutting motion is produced and initiated.

Although particular preferred embodiments of the invention have been described above for illustrative purposes, it will be understood that variations or modifications of such disclosure, which come within the scope of the appended claims, are fully contemplated.

The embodiments of the invention in which an exclusive property or privilege is claimed are defined as follows:

1. A method for forming a U-shaped tubular device from an elongated tubular element comprising the steps:

advancing a length of said elongated tubular element a predetermined distance through and relative to an annular cutting member having a radially inwardly projecting, circular cutting edge of slightly larger diameter than the outside diameter of said elongated element;

gripping two portions of said elongated element on opposite sides of said cutting member;

causing said cutting member to move relative to said elongated element, while the axes thereof remain substantially parallel, in an eccentric path around said element;

continuously urging a portion of said cutting edge against the external surface of said elongated element, whereby a circular cut is made in said external surface;

causing said two portions of said element to be urged axially away from each other after the cutting of said element has commenced and substantially before the cutting edge penetrates said element whereby said two portions of said element are separated; and bending one of said portions into said U-shaped member.

2. A method according to claim 1, wherein said eccentric movement of said annular member is terminated shortly after said two portions of said element are separated; and wherein the part of said cutting edge engaged with said element continuously and rapidly advances along said cutting edge, the main thrust of the cutting action being in a nonradial direction.

3. A method according to claim 1, including a plurality of adjacent annular cutting members having substantially parallel axes and wherein a plurality of elongated elements are simultaneously and individually moved through and relative to each said annular cutting member; and wherein said annular cutting members are simultaneously moved eccentrically around said elements.

4. An apparatus for cutting an elongated, tubular element into two separate portions, the combination comprising:

a base frame having guide means defining a path along which said element is advanced in an axial direction;

drive means adapted to engage said element and advance it along said path;

a cutting head supporting an annular cutting member having an annular, inwardly extending cutting edge substantially coaxial with said path, said cutting edge having a slightly larger inside diameter than the outside diameter of said element so that said element can be moved along said path through said annular member;

actuating means connected to said cutting head for effecting eccentric movement of said annular member around said element and continuously urging said cutting edge against the radially outer surface of said element;

alignment means releasably engageable with said cutting head for preventing said eccentric movement of said cutting member while said drive means is advancing said tubular element through said cutting member;

first and second gripping means located on opposite sides of said cutting head and adapted to engage first and second portions of said element located on opposite sides of said cutting head, said second gripping means being part of a bending device whereby the portion of said tubular element gripped thereby is bent into a U-shaped form;

means adapted to move said first gripping means axially away from said second stationary gripping means while said actuating means is operating.

5. An apparatus according to claim 4, wherein said cutting head has a plurality of adjacent cutting members having substantially parallel axes for simultaneously receiving and cutting a plurality of elongated tubular elements; and wherein said gripping means engage all of said elongated elements.

6. An apparatus according to claim 4, including:

a pair of spaced and substantially parallel head plates mounted upon said frame and intersecting said path substantially perpendicularly;

axially aligned guide openings extending through said head plates substantially coaxially with said path;

said cutter head including a cutting support member disposed between said head plates for movement in a plane parallel therewith;

said annular cutting member being mounted in said support member substantially coaxially with said aligned openings;

mounting means disposed radially outwardly of said cutter support member, and resiliently flexible means connecting said cutter support member to said mounting means for resiliently positioning said support member with respect to said mounting means; and said actuating means being connected to said mounting means and adapted to effect an eccentric movement thereof with respect to said path, whereby said cutting edge moves eccentrically around and thereby severs a tubular element extending through the cutter member.

7. An apparatus according to claim 6, wherein said mounting means is an annulus substantially concentric with said path;

wherein said resiliently flexible means comprises a plurality of coil springs extending substantially radially of said path between said support member and said annulus;

wherein said head plates and said support member have aligned openings of substantially the same diameter and spaced radially from said path; and including pin means mounted upon said frame for snug reception into said aligned openings, and means for effecting axial movement of said pin means into said aligned openings to prevent relative movement between said support member and said head plates.

8. An apparatus according to claim 7, wherein said head plates have plural pairs of axially aligned and axially parallel guide openings, and wherein an equal number of cutter members are axially aligned with said plural pairs, said guide openings and cutter members being arranged close together for simultaneously receiving a plurality of elongated tubular elements; and plural pin means and plural sets of aligned openings for receiving said pin means.

References Cited
UNITED STATES PATENTS

| | | | |
|---|---|---|---|
| 3,108,819 | 10/1963 | McKay | 82—20X |
| 3,154,976 | 11/1964 | Chase | 72—67 |

CHARLES W. LANHAM, Primary Examiner

R. M. ROGERS, Assistant Examiner

U.S. Cl. X.R.

72—339; 83—200; 225—2, 96, 101